United States Patent [19]
Cherico et al.

[11] Patent Number: 5,928,717
[45] Date of Patent: Jul. 27, 1999

[54] PROCESS FOR FORMING A REFRACTORY REPAIR MASS

[75] Inventors: Stephen Cherico, North Olmsted; John Bacon, Medina, both of Ohio

[73] Assignee: Fosbel International Limited, Tamworth, United Kingdom

[21] Appl. No.: 08/973,683

[22] PCT Filed: Jun. 7, 1996

[86] PCT No.: PCT/IB96/00567

§ 371 Date: Dec. 9, 1997

§ 102(e) Date: Dec. 9, 1997

[87] PCT Pub. No.: WO96/41778

PCT Pub. Date: Dec. 27, 1996

[30] Foreign Application Priority Data

Jun. 9, 1995 [GB] United Kingdom .................. 9511692

[51] Int. Cl.$^6$ ............................ B05D 35/00; B05C 13/00
[52] U.S. Cl. ........................... 427/140; 427/142; 427/427; 427/287; 50/125; 50/127; 50/135; 50/151
[58] Field of Search ..................................... 501/125, 127, 501/135, 151; 427/140, 427, 287, 142

[56] References Cited

U.S. PATENT DOCUMENTS

| | | |
|---|---|---|
| 3,684,560 | 8/1972 | Brichard et al. . |
| 3,800,983 | 4/1974 | Brichard et al. . |
| 4,008,109 | 2/1977 | Norton ...................................... 149/37 |
| 4,174,972 | 11/1979 | Drouzy et al. ............................. 106/64 |
| 4,792,468 | 12/1988 | Robyn et al. . |
| 4,900,484 | 2/1990 | Zlamal ...................................... 264/30 |
| 4,920,084 | 4/1990 | Robyn et al. . |
| 5,002,805 | 3/1991 | Robyn ....................................... 427/309 |
| 5,002,910 | 3/1991 | Robyn ....................................... 501/103 |
| 5,242,639 | 9/1993 | Mottet et al. .............................. 264/80 |
| 5,401,698 | 3/1995 | Mottet et al. ............................. 501/105 |
| 5,686,028 | 11/1997 | Meynckens et al. ...................... 264/30 |

FOREIGN PATENT DOCUMENTS

| | | |
|---|---|---|
| 0040044 | 11/1981 | European Pat. Off. . |
| 0274286 | 7/1988 | European Pat. Off. . |
| 0323555 | 7/1989 | European Pat. Off. . |
| 2553404 | 4/1985 | France . |
| 02274862 | 11/1990 | Japan . |
| 1468831 | 3/1977 | United Kingdom . |
| 2234502 | 2/1991 | United Kingdom . |
| 2257136 | 1/1993 | United Kingdom . |
| 2284415 | 6/1995 | United Kingdom . |

*Primary Examiner*—Janyce Bell
*Attorney, Agent, or Firm*—Venable; George H. Spencer; Ashley J. Wells

[57] ABSTRACT

A powder mixture for use in ceramic welding repair of a refractory material containing alumina includes refractory particles including alumina; at least 5% by weight of a metallic combustible which is at least 30% aluminum; and from 3 to 10% by weight of an additive which is at least one material selected from the group consisting of aluminum fluoride, barium sulfate, cerium oxide, and calcium fluoride. A process for repairing a refractory material which contains alumina includes providing the above powder mixture; and projecting the powder mixture against a surface of the refractory material in the presence of gaseous oxygen so that the combustible particles and the gaseous oxygen react and release the heat of reaction against the surface and form a coherent refractory mass.

24 Claims, No Drawings

PROCESS FOR FORMING A REFRACTORY REPAIR MASS

BACKGROUND OF THE INVENTION

1. Field of the Invention

The present invention relates to a process for forming a refractory repair mass, in particular to a process for forming a refractory repair mass on an alumina-containing surface. It is especially concerned with the repair of an alumina-containing material which is to be exposed to heavy duties, for example to contact with molten aluminium or to the severe conditions encountered in a glass tank at the "glass line" (the upper surface of the molten glass).

2. Description of the Related Art

The process uses a technique of the type generally known as "ceramic welding", in which a mixture of solid refractory particles and solid combustible fuel particles of a material which generates a refractory oxide are projected against the surface to be repaired and the fuel is there reacted with oxygen-rich gas, usually substantially pure oxygen, such that the heat of reaction is released against the surface so that a coherent refractory repair mass is formed.

Such "ceramic welding" is described in GB patent 1,330, 894 (Glaverbel) and GB 2,170,191 (Glaverbel). The combustible particles are particles whose composition and granulometry are such that they react in a strongly exothermic manner with the oxygen to form a refractory oxide while releasing the necessary heat for melting, at least superficially, the projected refractory particles. The projection of particles is conveniently and safely achieved by using the oxygen as a carrier gas for the particle mixture. In this manner a coherent refractory repair mass is formed against the surface on to which the particles are projected.

These known ceramic welding processes can be employed for forming a refractory article, for example, a block having a particular shape, but they are most widely used for forming coatings or for repairing bricks or walls and are particularly useful for repairing or reinforcing existing refractory structures.

Alumina-based refractory materials display good resistance to thermal shock and for this reason are widely chosen for the refractory blocks used for severe duties in the steel, non-ferrous (aluminium and copper) and glass industries. For example, blocks of AZS (alumina together with silica and zirconia) are used at the liquid level in a glass tank furnace. Electrofused "Zac" (trade mark) bricks contain for instance 50–51% by weight alumina, 15–16% silica and 32–33% zirconia. Higher alumina contents are present in the blocks used in constructing aluminium smelting/melting furnaces, e.g. material containing 60 to 85 wt % alumina and 5 to 35 wt % silica together with small amounts of a cement.

Ceramic welding is well suited to the repair of alumina-containing refractories such as AZS and higher alumina containing material. These refractories are exposed to service temperatures up to 1100° C. in the aluminium industry and even higher in gass furnaces. As with most other types of furnace, it is desirable that repairs are conducted while the furnace remains hot, e.g. keeping a wall to be repaired at a temperature of at least 500° C., desirably at least 800° C.

In some cases, the repair mass must resist erosion and corrosion by molten material, e.g. molten aluminium in the aluminium industry, and must display good compatibility with, and adhesion to, the surface to be repaired. In the case of aluminium smelting/melting furnaces the refractories are affected by the molten material, which may contain magnesium in addition to aluminium. Both these molten metals react with the refractory such that with the passage of time the crystalline structure at the surface and increasingly deeply into the interior of the material progressively includes corundum ($Al_2O_3$) and spinel ($MgO.Al_2O_3$). The thermal expansion of the surface is correspondingly modified, becoming substantially higher than that of the virgin material. It is thus necessary to apply a repair mass which is compatible with the modified material and resistant to molten metal.

For AZS refractories used in glass furnaces one means of protecting their surface against erosion or corrosion is to apply a coating of a refractory metal such as platinum. In this case it is necessary to provide a dense, non-porous, surface before depositing the metal on it. A surface of this quality is obtained by coating the base refractory with a refractory layer formed by ceramic welding.

SUMMARY OF THE INVENTION

We have now found that high quality durable repairs can be effected on alumina-containing refractories by employing a powder mixture containing an absorbency-reducing agent and a combustible which is largely aluminium metal.

Thus according to the present invention there is provided a process for the repair of a refractor material containing alumina in which process there is projected in the presence of gaseous oxygen against the surface of the refractory material a powder mixture comprising refractory particles and combustible particles such that reaction between the combustible particles and oxygen occurs against the surface, thereby releasing the heat of reaction against the surface so that a coherent refractory mass is formed, characterised in that the powder mixture comprises alumina and, by weight, at least 5% of a metallic combustible which is at least 30% aluminium and 3 to 10% of an absorbency-reducing agent.

The invention further provides a powder mixture for use in the ceramic welding repair of a refractory material containing alumina, which mixture contains refractory particles and combustible particles and is characterised in that it comprises alumina and, by weight, at least 5% of a metallic combustible which is at least 30% aluminium and 3 to 10% of an absorbency-reducing agent.

The use of a powder mixture according to the invention produces a repair mass with low porosity and a good resistance to penetration. It consequently displays good resistance to corrosion and to reaction with molten metal. Surprisingly some of the absorbency-reducing agent has been found in repair masses of the invention, having survived the exothermic reaction. Such retained absorbency-reducing agent apparently serves to assist in giving the mass its improved properties. Hitherto it was believed that the said agent would completely decompose and/or be completely lost during the exothermic reaction.

The improved repair masses of the invention thus provide increased quality and reliability of repairs to refractories containing alumina.

According to the invention it is possible to achieve repair masses containing high proportions of alumina, even in excess of 70% by weight of the repair mass. The figure may be greater than the alumina content of the projected powder mixture as such because of the conversion of at least part of the projected aluminium metal to alumina.

The refractory particle constituents of the powder mixture according to the invention are typically the alumina as such plus a compound which generates alumina during the formation of the refractory mass. Examples of such compounds which are readily available are bauxite ($Al_2O_3.2H_2O$), mullite ($3Al_2O_3.2SiO_2$), sintered alumina ($Al_2O_3$) and aluminous spinel (e.g. $MgO.Al_2O_3$).

The refractory particles preferably comprise substantially no particles with a size greater than 4 mm, most preferably none greater than 2.5 mm. This facilitates the smooth projection of the powder. The size range spread factor f(G) of the refractory particles is preferably not less than 1.2. The said factor f(G) is used herein in relation to a given species of particles to denote the factor:

$$f(G) = \frac{2(G_{80} - G_{20})}{(G_{80} + G_{20})}$$

where $G_{80}$ denotes the 80% grain size of the particles of that species and $G_{20}$ denotes the 20% grain size of the particles of that species.

The absorbency-reducing agent is preferably one or more of aluminium fluoride ($AlF_3$), barium sulphate ($BaSO_4$), cerium oxide ($CeO_2$) and calcium fluoride ($CaF_2$), the latter being the most preferred. Aluminium fluoride sublimes at 1291° C. and thus has a greater tendency to be lost during the exothermic reaction. The absorbency-reducing agent preferably comprises particles having a maximum particle size of less than 500 μm. It may typically have an average particle size of at least 50 μm.

It is known in the aluminium industry to place refractory blocks having special compositions at points which are in contact with molten metal. The special composition comprises an additive, e.g. aluminium fluoride, barium sulphate or calcium fluoride, which makes the block less prone to being wetted by the molten metal. These additives normally decompose or volatilise at the temperatures which are reached in the ceramic welding reaction zone. It is therefore surprising that these substances can be used in the present invention.

The metallic combustible should include a significant proportion of aluminium (not less than 30% by weight, and possibly 50% or more) but can include other combustibles such as magnesium, zirconium and chromium. As is implied by the term "metallic combustible" the element silicon is not a preferred component of the combustible material, but its use is not excluded. Alloys of two or more combustible materials, for example of aluminium and magnesium (usually with a greater content of aluminium than magnesium), are conveniently used as components of the combustible. They can be used in combination with granular aluminium. The combustible preferably has a maximum particle size of 100 μm and an average particle size of less than 50 μm.

The feed rate of the powder mixture to the point of repair is typically in the range 50 to 500 kg/h.

DESCRIPTION OF THE PREFERRED EMBODIMENTS

The following examples illustrate the invention. It is emphasized that the present invention is not limited to the specific constituents, proportions, parameters and procedures mentioned therein.

EXAMPLE 1

A powder mixture as defined below was employed for the repair of a low-cement bonded refractory material used in an aluminium melting furnace. The original constituents (weight %) of the base material had been as follows:

alumina 63% silica 33% mortar, and a small quantity of calcium fluoride.

The porosity of the original base material was 17.4. Because the furnace had been in use for some time the surface layer of the refractory contained a high proportion of corundum and spinel.

A ceramic welding powder mixture was formed having the following composition:

| Component | Weight % |
|---|---|
| Bauxite | 68.2 |
| Mullite | 18.2 |
| $CaF_2$ | 4.2 |
| Mg/Al alloy | 3.1 |
| Al grains | 6.3 |

The bauxite and mullite had a maximum particle size of about 2 mm. The combustible MG/Al alloy contained a nominal 30% by weight of magnesium and 70% aluminium, with a maximum particle size of 100 μm and an average particle size of about 42 μm. The aluminium was in the form of grains having a nominal maximum size of 45 μm and an average particle size of 12 μm. The $CaF_2$ had a particle size of less than 420 μm, with 90% (by weight) of the particles being greater than 44 μm.

The powder mixture was projected at a rate of 80 kg/h in a stream of commercially pure oxygen through a welding lance to the surface to be repaired. On contact with the surface, which was at a temperature of 800° C., the aluminium and magnesium reacted with the oxygen, forming a repair mass at the area to which the lance was directed.

The formed mass had an alumina content of approximately 80% by weight, a porosity of about 16% and a bulk density of 2.5 to 2.7 g/cc ($kg/m^3$), giving it a very low absorbency for molten metal. X-ray analysis showed some $CaF_2$ retained in the formed mass. It is suspected that the residual presence of $CaF_2$ assists in giving the mass its good resistance to penetration, and consequently to the reaction with the molten metal.

EXAMPLE 2

A powder mixture as defined in Example 1, but in which the small quantity of calcium fluoride was replaced by a small quantity of barium sulphate, was employed for the repair of a refractory block having the following composition (weight %):

alumina 82% silica 8% mortar, and a small quantity of barium sulphate.

The powder mixture was projected at a rate of 80 kg/h in a stream of commercially pure oxygen through a welding lance to the surface to be repaired. On contact with the surface, which was at a temperature of 1000° C., the aluminium and magnesium reacted with the oxygen, forming a repair mass at the area to which the lance was directed.

EXAMPLE 3

A powder mixture as defined in Example 1 was employed for the protection of an AZS refractory block, in this case a highly refractory electrofused "Zac" brick based on alumina and zirconia and having the following composition (weight %):

alumina 50–51% zirconia 32–33% silica 15–16% sodium oxide 1% (approximately).

The powder mixture was projected at a rate of 30 kg/h in a stream of commercially pure oxygen through a welding lance to the surface to be protected. On contact with the surface, which was at a temperature of 1500° C., the aluminium and magnesium reacted with the oxygen, forming a mass at the area to which the lance was directed.

The formed mass had a low porosity and was suitable to receive a protective deposited layer of platinum.

What is claimed is:

1. A process for repairing a refractory material which contains alumina, comprising:
   a. providing a powder mixture comprised of:
      i. refractory particles including alumina;
      i.i. at least 5% by weight of a metallic combustible which includes at least 30% by weight aluminum; and
      i.i.i. from 3 to 10% of an additive which is at least one material selected from the group consisting of aluminum flouride, barium sulfate, cerium oxide, and calcium fluoride; and
   b. projecting the powder mixture against a surface of the refractory material in the presence of gaseous oxygen so that the combustible particles and the gaseous oxygen react and release the head of reaction against the surface and form a coherent refractory mass.

2. The process as claimed in claim 1, wherein the refractory particles comprise at least one material selected from the group consisting of bauxite, mullite, sintered alumina, and aluminous spinel.

3. The process as claimed in claim 1, wherein the refractory particles comprise substantially no particles having a particle size which is greater than 4 mm.

4. The process as claimed in claim 3, wherein the refractory particles comprise substantially no particles having a particle size which is greater than 2.5 mm.

5. The process as claimed in claim 1, wherein the additive comprises particles having a maximum particle size of less than 500 $\mu$m.

6. The process as claimed in claim 1, wherein the metallic combustible comprises at least 50% aluminum by weight.

7. The process as claimed in claim 1, wherein the metallic combustible has a maximum particle size of 100 $\mu$m and an average particle size of less than 50 $\mu$m.

8. The process as claimed in claim 1, wherein the powder mixture is projected onto the refractory material to be repaired at a rate ranging from 50 to 500 kg/h.

9. The process as claimed in claim 1, wherein the coherent refractory mass contains at least 70% of alumina, by weight.

10. A process for repairing a refractory material which contains alumina, comprising:
    a. providing a powder mixture comprised of;
       i. refractory particles including alumina;
       i.i. at least 5% by weight of a metallic combustible which includes at least one of magnesium, zirconium and chromium, and at least 30% by weight aluminum; and
       i.i.i. from 3 to 10% of an additive which is at least one material selected from the group consisting of aluminum fluoride, barium sulfate, cerium oxide, and calcium flouride; and
    b. projecting the powder mixture against a surface of the refractory material in the presence of gaseous oxygen so that the combustible particles and the gaseous oxygen react and release the heat of reaction against the surface and form a coherent refractory mass.

11. The process as claimed in claim 10, wherein the metallic combustible comprises an alloy of at least two combustible materials.

12. The process as claimed in claim 11, wherein the alloy comprises aluminum and magnesium.

13. The process as claimed in claim 11, wherein the at least 30% by weight of aluminum of the metallic combustible is granular aluminum, and wherein the alloy is used in combination with the granular aluminum.

14. A powder mixture for use in ceramic welding repair of a refractory material containing alumina, comprising:
    refractory particles including alumina;
    at least 5% by weight of a metallic combustible which is at least 30% aluminum; and
    from 3 to 10% by weight of an additive which is at least one material selected from the group consisting of aluminum fluoride, barium sulfate, cerium oxide, and calcium fluoride.

15. The powder mixture as claimed in claim 14, wherein the refractory particles comprise at least one material selected from the group consisting of bauxite, mullite, sintered alumina, and aluminous spinel.

16. The powder mixture as claimed in claim 14, wherein the refractory particles comprise substantially no particles having a particle size which is greater than 4 mm.

17. The powder mixture as claimed in claim 16, wherein the refractory particles comprise substantially no particles having a particle size which is greater than 2.5 mm.

18. The powder mixture as claimed in claim 14, wherein the additive comprises particles having a maximum particle size of less than 500 $\mu$m.

19. The powder mixture as claimed in claim 14, wherein the metallic combustible comprises at least 50% aluminum by weight.

20. The powder mixture as claimed in claim 14, wherein the metallic combustible has a maximum particle size of 100 $\mu$m and an average particle size of less than 50 $\mu$m.

21. A powder mixture for use in ceramic welding repair of a refractory material containing alumina, comprising:
    refractory particles including alumina;
    at least 5% by weight of a metallic combustible which is at least one of magnesium, zirconium and chromium, and at least 30% aluminum; and
    from 3 to 10% by weight of an additive which is at least one material selected from the group consisting of aluminum fluoride, barium sulfate, cerium oxide, and calcium fluoride.

22. The powder mixture as claimed in claim 21, wherein the metallic combustible comprises an alloy of at least two combustible materials.

23. The powder mixture as claimed in claim 22, wherein the metallic combustible comprises an alloy of aluminum and magnesium.

24. The powder mixture as claimed in claim 22, wherein the at least 30% by weight of aluminum of the metallic combustible is granular aluminum, and wherein the alloy is used in combination with the granular aluminum.

* * * * *